ately attached to the sheet clipping, by cutting out a part

United States Patent [19]

Aoyagi

[11] 4,032,679
[45] * June 28, 1977

[54] STICKER

[75] Inventor: Katumi Aoyagi, Chofu, Japan

[73] Assignee: Shiro Kojima, Tokyo, Japan; a part interest

[ * ] Notice: The portion of the term of this patent subsequent to Dec. 9, 1992, has been disclaimed.

[22] Filed: Nov. 22, 1974

[21] Appl. No.: 526,401

Related U.S. Application Data

[62] Division of Ser. No. 355,211, April 27, 1973, Pat. No. 3,925,585.

[30] Foreign Application Priority Data

Apr. 27, 1972 Japan .............................. 47-42528

[52] U.S. Cl. .................................. 428/42; 40/2 R; 40/125 A; 283/18; 428/40; 428/41; 428/43
[51] Int. Cl.² ............................................ B32B 3/16
[58] Field of Search .................. 206/390, 813, 445; 40/125 A, 2 R, 330; 428/40–43; 156/584; 283/18

[56] References Cited

UNITED STATES PATENTS

| 2,304,787 | 12/1942 | Avery ................................ 206/813 |
| 3,166,186 | 1/1965 | Karn ................................... 428/42 |
| 3,226,862 | 1/1966 | Gabruk ............................... 40/2 R |
| 3,315,386 | 4/1967 | Kest et al. .......................... 40/2 R |
| 3,315,387 | 4/1967 | Heuser ............................... 40/2 R |
| 3,466,217 | 9/1969 | Mott ................................... 206/813 |
| 3,503,493 | 3/1970 | Nagy .................................. 206/820 |
| 3,522,136 | 7/1970 | Williams et al. ................... 156/584 |
| 3,737,364 | 6/1973 | Heindl ................................ 428/42 |
| 3,925,585 | 12/1975 | Agyagi ............................... 428/40 |

OTHER PUBLICATIONS

Avery Manifold Labels (Stock No. 192.2 (1965) catalog) (Avery Adhesives Co., Monrovia, Cal.
Kimball Systems "Able Stik" Feb. 1972.

*Primary Examiner*—George F. Lesmes
*Assistant Examiner*—R. J. Roche
*Attorney, Agent, or Firm*—Robert E. Burns; Emmanuel J. Lobato; Bruce L. Adams

[57] ABSTRACT

A sheet, having a pressure sensitive adhesive layer on the back thereof to provide a sticker, is provided with a parting line to form a sheet clipping by cutting out a part of the sheet inside the sheet. A detachable release paper is temporarily attached on the adhesive layer of the sheet. The release paper is provided with at least one parting line, not coincident with the parting line of the sheet, to form a portion of release paper temporarily attached to the sheet clipping, by cutting out a part of said release paper.

The sheet clipping and the sheet can have correlated marks or designs imprinted thereon.

4 Claims, 6 Drawing Figures

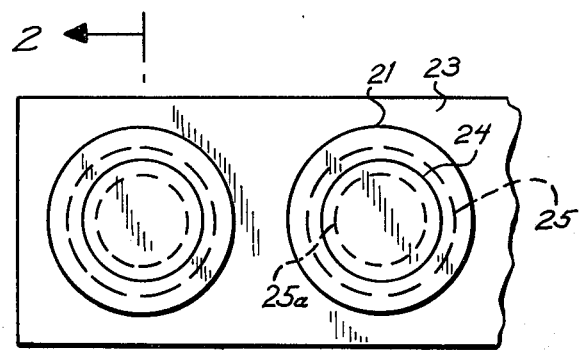
FIG. 4
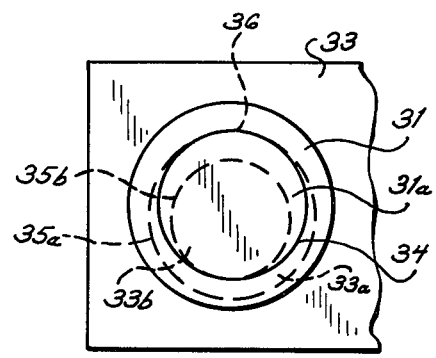
FIG. 5
FIG. 6
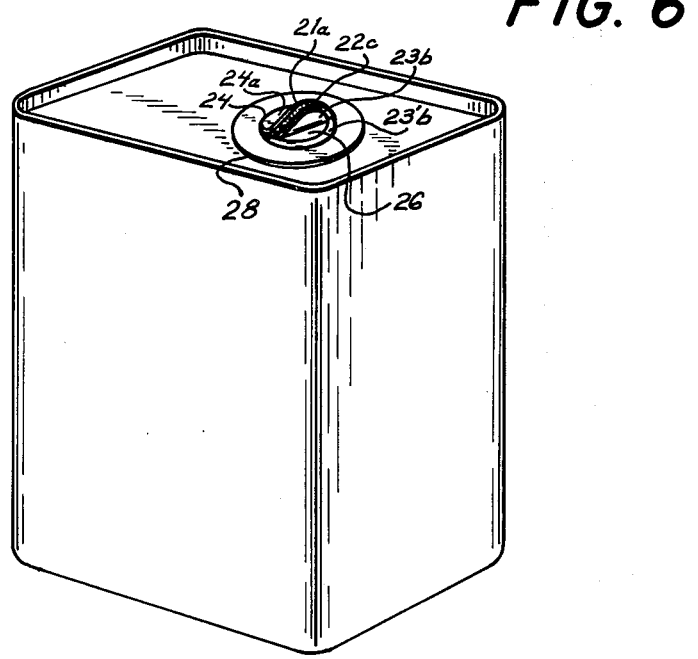

STICKER

This is a division of application Ser. No. 355,211 filed Apr. 27, 1973, now U.S. Pat. No. 3,925,585.

BACKGROUND OF THE INVENTION

Up to the present, adhesive goods such as adhesive lable, adhesive sealing paper and the like have been used for confectionary such as chocolate, candy and the like which were packed in a small box, a bag, etc., however, these stickers have mere indications necessary for respective goods. Thus, the stickers have never been used for the purpose of services for buyers, given by sellers and manufacturers of said goods. For example the stickers have not been used to provide lottery tickets, premium tickets and the like. In most cases, these service tickets are made separately and contained in a packed box together with the confectionery, so that manufacturing and enclosing thereof are troublesome and not advantageous from economical viewpoints.

SUMMARY OF THE INVENTION

This invention relates to a sticker, in which a sheet portion or clipping having a pressure sensitive adhesive layer temporarily attached on a release paper is made available for secondary use.

It is an object of the invention to provide a sticker available as a clipping of a sticking sheet by cutting out a part thereof.

Another object of the invention is to provide a sticker, in which a sheet portion becomes a label or a seal available as a service ticket or other service element.

A further object of the invention is to provide a sticker, in which parts of a sheet and parts of a release paper under said sheet are united in one body through an adhesive layer, parting lines being provided in said sheet and said release paper to enable said parts to be cut out, and for example to become a lid for an opening of a container, capable of opening and closing thereof freely.

Still another object of the invention is to provide a sticker, in which said sheet and its clipping may be easily detached and attached.

A still further object of the invention is to provide said sticker which may be advantageously manufactured from economical viewpoints by a simple method without requiring any large space.

Other and further objects function and effect of the invention will be apparent from the following embodiments and the feature thereof will be pointed out particularly in the appended claims.

BRIEF DESCRIPTION OF THE DRAWINGS

FIG. 4 is a plan view of some of the stickers, FIG. 5 is a plan view of a variant of the sticker; and, FIG. 6 is a perspective view of the sticker, applied to a container and in process at being divided by removal of a clipping.

DESCRIPTION OF THE PREFERRED EMBODIMENTS

Figure 1:
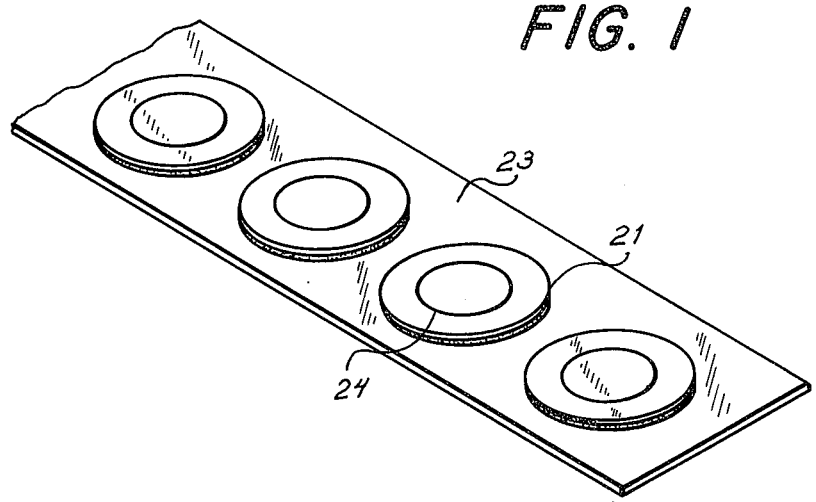
FIG. 1 is a perspective view of a group of stickers according to this invention.
Figure 2:
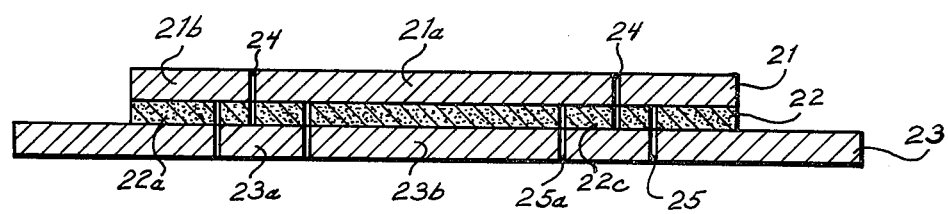
FIG. 2 is a sectional view of one of the stickers taken along line 2—2 of FIG. 4.
Figure 3:
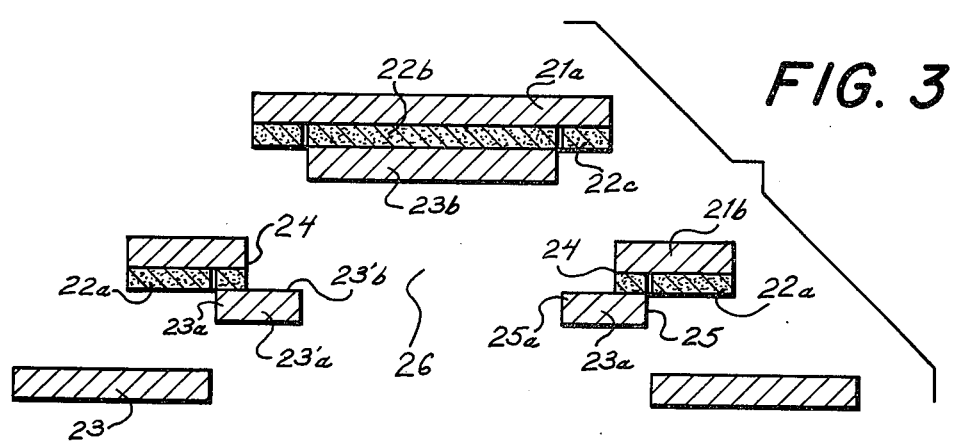
FIG. 3 is an exploded sectional view of the sticker.

In FIGS. 1 to 4, there is shown an embodiment of sticker according to this invention.

Each sticker comprises a sheet 21 made of a flexible sheet material, and an adhesive layer 22 of pressure sensitive adhesive. The adhesive layer 22 has a first, upper surface in contact with the underside of said sheet 21. On a second, lower surface of said adhesive layer a detachable release paper 13 is temporarily attached. In said sheet 21 there is provided a parting line 24 to form a clipping 21a of said sheet by cutting out a part thereof. When the sheet 21 is detached from the release paper 23, the clipping 21a cut out along the parting line 24, is left on the release paper. Thus the sticker may be detached from said clipping in form of an annular piece 21b of sheet material. On the back of the detached clipping 21a and the annular piece 21b, respectively adhesive layers 22a and 22b are exposed, so that the clipping and annular piece may be stuck independently to suitable surfaces. Letters or marks related to lot number, quantity, etc. as well as to name of medicines can be printed on the clipping and correspondingly on the annular piece. Thus it is possible to prepare stickers, for example for the use of a pharmaceutical company. When the company sends medicines to sales stores, if proceeds as follows. The annular piece 21b is detached from the corresponding sticker 21a for every package of medicines, to stick the annular piece on a seal or the like. The clipping 21a can then be stuck on an invoice to send it to a recipient, who is thereby enabled to check name, quantity, etc. by collating the annular piece on the packing with the clipping on the invoice. In this way, since indication pieces divided from one sheet are respectively stuck on the packed medicines and on the invoice, mistake and trouble are avoided.

According to the invention the release paper is also provided with at least one parting line. As shown in FIGS. 6, 2, 3 and 4 parting lines 25, 25a are provided in the release paper 23 under the sheet 21a, 21b on both sides of parting line 24 of this sheet. Below the outer sheet portion 21b, the parting line 25 enables dividing an inner piece 23a of the release paper, longer than the sheet clipping 21a, from the remainder of release paper 23. The parting line 25a enables dividing an auxiliary innermost piece 23b of release paper from the surrounding release paper pieces 23a 23 inside of the sticker parting line 24. By means of this construction the sheet 21 of the sticker temporarily connects the piece 23a and the auxiliary piece 23b of release paper, cut out along the parting line 25, to the adhesive layer 22 thereof. On the other hand, a part of adhesive layer 22a appears on the outside of said piece 23a of release paper, so that the layer can be attached to packed goods. Sheet 21 has the parting line 24 and the piece 23a of release paper is provided with the additional parting line 25a to cut out the auxiliary piece 23b of release paper. Accordingly, when the clipping 21a is detached from sheet 21, the auxiliary piece 23b of release paper temporarily sticks to the adhesive layer 22b of said clipping, and a part 22c of said adhesive layer appears at a portion corresponding to the outside of said temporary sticking auxiliary piece.

When the clipping 21a is detached from the sheet 21 sticking to some goods (FIG. 3), said clipping is detached with its adhesive layer 22b and with the auxiliary piece 23b, and hole 26 corresponding to said auxiliary piece occurs in the remaining piece 23a of release paper as well as an inner marginal portion 23'b of an annular piece 23'a of the piece of release paper which is left uncut from said piece of release paper. Therefore, the exposed adhesive layer 22a of said sheet 21 may stick on a marginal portion of an opening of a container 27 receiving granular cleaner within to cover up the opening of said container (FIG. 6). When the clipping 21a is detached from this sheet, the clipping is stripped off together with the auxiliary piece 23b to open the hole 26, so that a required quantity of goods may be easily taken out by tilting said container. The exposed adhesive layer 22c of the detached clipping may stick on the exposed inner marginal portion 23'b of the piece of release paper, which is retained at the marginal portion of the opening of container, to close the opening easily. Since said inner marginal portion 23'b is detachable, no adhesive property is retained after the clipping 21a is stripped off, so that no cleanser is attached to said portion. And, if the cleanser is attached, it may be easily removed by wiping it by cloth or paper, so that the adhesive power of adhesive layer 22c of the clipping is not hindered but the clipping may be used repeatedly.

As also indicated in FIG. 6, a connecting portion 24a may be provided, the parting line 24 for cutting out the clipping 21a of the sheet 21. Said connecting portion serves as a hinge to facilitate opening and renewed closing of the clipping 21a, and to prevent the clipping 21a from being lost when it is opened.

Finally, reference is made to FIG. 5 showing parting lines 35a and 35b which annular form piece 33a and central piece 33b of release paper to be provided on a release paper 33. In this embodiment a portion 36 of parting line 35a is overlapped with a parting line 34 for forming a clipping 31a of a sheet 31 on said release paper. This construction enables cutting out the sheet clipping 31a simultaneously with the annular piece 33a of release paper.

Thus it will be seen that the new sticker comprises a sheet 21 having a layer 22 of pressure sensitive adhesive disposed thereon and substantially covering a surface thereof, the sheet having a dividing line 24 defining an inner sheet clipping portion 21a and, around the same, an annular portion 21b of the sheet, and enabling dividing the sheet into these portions pursuant to application of an imprint to the sheet which after the dividing correlates the inner and annular portions. Additionally, according to the invention as claimed, a detachable release paper 23 is temporarily attached to the layer of adhesive, and has parting lines 25, 25a surrounding one another to define and enable mutual separation of inner, intermediate and outer portions 23b, 23a of the release paper 23, the intermediate portion 23a underlying the dividing line 24 of the sheet, to facilitate separate application of the inner and annular portions to different articles.

Although the invention has been described in a specific form of embodiments, it is to be understood that the invention is not limited to this specific embodiment thereof but various changes may be made in the scope of sprit of the invention as defined in the appended claims.

What is claimed is:

1. A sticker, comprising:
   a sheet having a layer of pressure sensitive adhesive disposed thereon and substantially covering a surface thereof, the sheet having a dividing line defining an inner sheet clipping portion and, around the same, an annular portion of the sheet, and enabling dividing the sheet into these portions pursuant to application of an imprint to the sheet which after said dividing correlates the inner and annular portions; and
   a detachable release paper temporarily attached to the layer of adhesive and having parting lines surrounding one another to define and enable mutual separation of inner, intermediate and outer parts of the release paper, the intermediate part underlying the dividing line of the sheet,
   thereby facilitating separate application of the inner and annular portions to different articles.

2. A sticker according to claim 1 in which the inner part of the release paper is an auxiliary part underlying the entire inner sheet clipping except a marginal part thereof which overlies a corresponding part of the intermediate part of the release paper.

3. A sticker according to claim 1 in which the inner sheet clipping portion is a central portion of the sheet, and the inner part of the release paper is disposed centrally of said paper, the sheet bearing an imprint, part of which covers the inner sheet clipping portion while another part covers the annular portion of the sheet, to enable correlating the inner sheet clipping portion with the annular portion after said dividing thereof.

4. A sticker according to claim 1 in which the outer part of the release paper partly underlies and partly extends outwardly from the annular portion the sheet.

* * * * *